United States Patent
Kahane et al.

(10) Patent No.: US 6,711,158 B1
(45) Date of Patent: *Mar. 23, 2004

(54) SYSTEM AND METHOD FOR PERSONAL MULTIMEDIA COMMUNICATION OVER A PACKET SWITCHED NETWORK

(75) Inventors: Opher Dan Kahane, Alfe-Menashe (IL); Scott Petrack, Jeruasalem (IL)

(73) Assignee: VocalTec Communications Ltd., Herzliya (IL)

(*) Notice: Subject to any disclaimer, the term of this patent is extended or adjusted under 35 U.S.C. 154(b) by 541 days.

This patent is subject to a terminal disclaimer.

(21) Appl. No.: 09/714,061

(22) Filed: Nov. 16, 2000

Related U.S. Application Data

(63) Continuation of application No. 08/780,739, filed on Jan. 8, 1997, now Pat. No. 6,243,398, which is a continuation-in-part of application No. 08/731,848, filed on Oct. 21, 1996, now abandoned.

(51) Int. Cl.[7] .............................................. H04L 12/66
(52) U.S. Cl. ...................... 370/352; 370/252; 370/522; 379/88.17
(58) Field of Search .................... 370/352–356, 370/400, 401, 252, 522; 379/88.17

(56) References Cited

U.S. PATENT DOCUMENTS 6,243,398 B1 * 6/2001 Kahane et al. .............. 370/352

* cited by examiner

Primary Examiner—John Pezzlo
(74) Attorney, Agent, or Firm—Darby & Darby

(57) ABSTRACT

A method for communicating between users which employ a plurality of communication devices over a packet switched network. The method includes the steps of receiving a precommunication request for a communication device or devices of said recipient to which said communication should be sent, determining in accordance with a communication receipt preferences of the recipient which communication device or devices should receive said communication and transmitting an indication to the requester to which communication device or devices said communication should be transmitted. The communication itself may be a single media or a multimedia communication.

7 Claims, 5 Drawing Sheets

SYSTEM AND METHOD FOR PERSONAL MULTIMEDIA COMMUNICATION OVER A PACKET SWITCHED NETWORK

CROSS REFERENCE TO RELEATED APPLICATIONS

This application is a continuation of U.S. patent application Ser. No. 08/780,739, filed Jan. 8, 1997, now U.S. Pat. No. 6,243,398, which is incorporated by reference in its entirety herein, which is a Continuation-in-Part application of commonly assigned U.S. patent application 08/731,848 Entitled WAN BASED SYSTEM AND METHOD FOR PERSONAL COMMUNICATION, filed Oct. 21, 1996 abn. the content of which Is incorporated herein by reference.

FIELD OF THE INVENTION

The present invention relates to a system and method for personal communication generally and more particularly to a wide area network (WAN) based system in which Individual users communicate with call management agents which direct incoming communications in accordance with their personal preferences.

BACKGROUND OF THE INVENTION

Packet switched networks, such as Wide Area Computer Networks (WAN), in particular the INTERNET network, allow users to communicate multimedia information therebetween. For example, the INTERNET PHONE™, commercially available from VocalTec Inc. of New Jersey, USA enables audio conferencing between two parties using two computer stations connected to the INTERNET and equipped with the INTERNET PHONE™ application. In another application, the conventional telephone network is connected to the WAN by telephony gateways so as to enable using both network based communications and conventional telephony over the WAN.

Generally speaking, state of the art systems enable users to use a large number of communication devices as a communication device in a WAN—conventional telephony integrated system. Examples are the INTERNET PHONE™, conventional phone, cell phone, answering machine, facsimile machine, video conferencing equipment, pagers and any application working over the Internet which requires participation of other parties, such as multi-user interactive games. The state of the art systems are deficient in many specs one being that users at present cannot direct incoming calls via the WAN to a device of their own choice.

Another deficiency of current systems exemplified utilizing the example of audio communication is that since telephony and WAN based audio communications are separate the user may not be available, i.e. one of his devices indicates that it is busy while another audio devices he has is actually free and ready to receive audio communications.

SUMMARY OF THE INVENTION

According to one aspect, the present invention is a system which enables users communicating via a WAN to direct incoming communications to a device of their choice.

According to another aspect of the invention the incoming communications may be multimedia communications and the recipient can direct them across media types, one non limiting example being receiving a communication originally directed to a white board by the recipient facsimile machine.

According to another aspect, the present invention provides a method which enables users communicating via a WAN to direct incoming communications to a device of their choice.

According to yet another aspect of the invention, the incoming communications may be multimedia communications and the recipient can direct them across media types, one non limiting example being receiving a communication originally directed to a white board by the recipient facsimile machine.

A further object of the present invention is to provide a system which enables users communicating via a WAN—conventional telephony integrated network to direct incoming communications to a device of their choice.

Yet a further object of the present invention is to provide a method which enables users communicating via a WAN—conventional telephony integrated network to direct incoming communications to a device of their choice.

Yet another object of the present invention to provide a system which enables users communicating via a WAN—conventional telephony integrated network to receive audio communications substantially any time through one of their audio communications devices (conventional telephone, cell phone, INTERNET PHONE™).

Still further, another object of the present invention is to provide a method which enables users communicating via a WAN—conventional telephony integrated network to receive audio communications substantially any time through one of their audio communications devices (conventional telephone, cell phone, INTERNET PHONE™).

According to an aspect of the present invention there is provided a method, in a packet switched network having a plurality of users, each of which employing a plurality of communication devices, for receiving communications in accordance with personal recipient preferences which Includes the following steps;

a. receiving a precommunication request for at least one communication device of the recipient to which the communication should be sent;

b. determining in accordance with a communication receipt preferences of the recipient which communication device or devices should receive the communication; and c. transmitting an indication to the communication initiator to which communication device or devices the communication should be transmitted.

In the preferred enbodiment, a communication management agent (CMA) of the recipient receives the precommunication request, the recipient communication management agent determines the communication device or devices in accordance to at least the communication receipt preferences stored therein, the CMA indicates to which communication device or devices the communication should be transmitted. Preferably, the communication receipt preferences include which communication device or devices are available for receiving the communication at each time interval from which communication initiators and in which order.

According to the present Invention, the communication may be a single media or a multimedia communication. In a preferred embodiment, in case of a multimedia communication, the communication receipt preferences also including cross media receipt preferences.

In accordance with a preferred embodiment of the present invention, the communication receipt preferences may also include redirection of the address to another communication management agent and the method further includes the step of redirecting the address to the another communication management agent.

According to another preferred embodiment, the communication management agent is also operative to identity at any time an available one of the plurality of communication devices operative to communicate the same type of media or a different type of media capable of receiving the communication, whereby the recipient is generally available any time.

In one preferred embodiment, the communication management agent is redirected to one of the communication devices currently used by the user, thereby enabling the user to determine the communication receipt preferences substantially in real time. Alternatively, the communication management agent is remote from the user.

In accordance with yet another preferred embodiment of the present invention, the precommunication request is received from the communication initiator communication devices or from an intermediate device to which any of the call initiator communication devices are connected.

The packet switched network may be a wide area network, the INTERNET wherein the communication management agent resides in a communication management agent server connected to the INTERNET, a local area network or an INTRANET.

In accordance with a preferred embodiment of the present invention, there is provided a communication management agents server (CMAS) connected to a packet switched network, the CMAS including a plurality of communication management agents (CMA) operating in accordance with the methods of the present invention.

In accordance with yet another preferred embodiment of the present invention, there is provided a plurality of communication management agents (CMA) operative in a packet switched network and operative in accordance with the methods of the present invention. In one preferred implementation of the present invention, the CMAs form a directory service of a packet switched network.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

Figure 1:
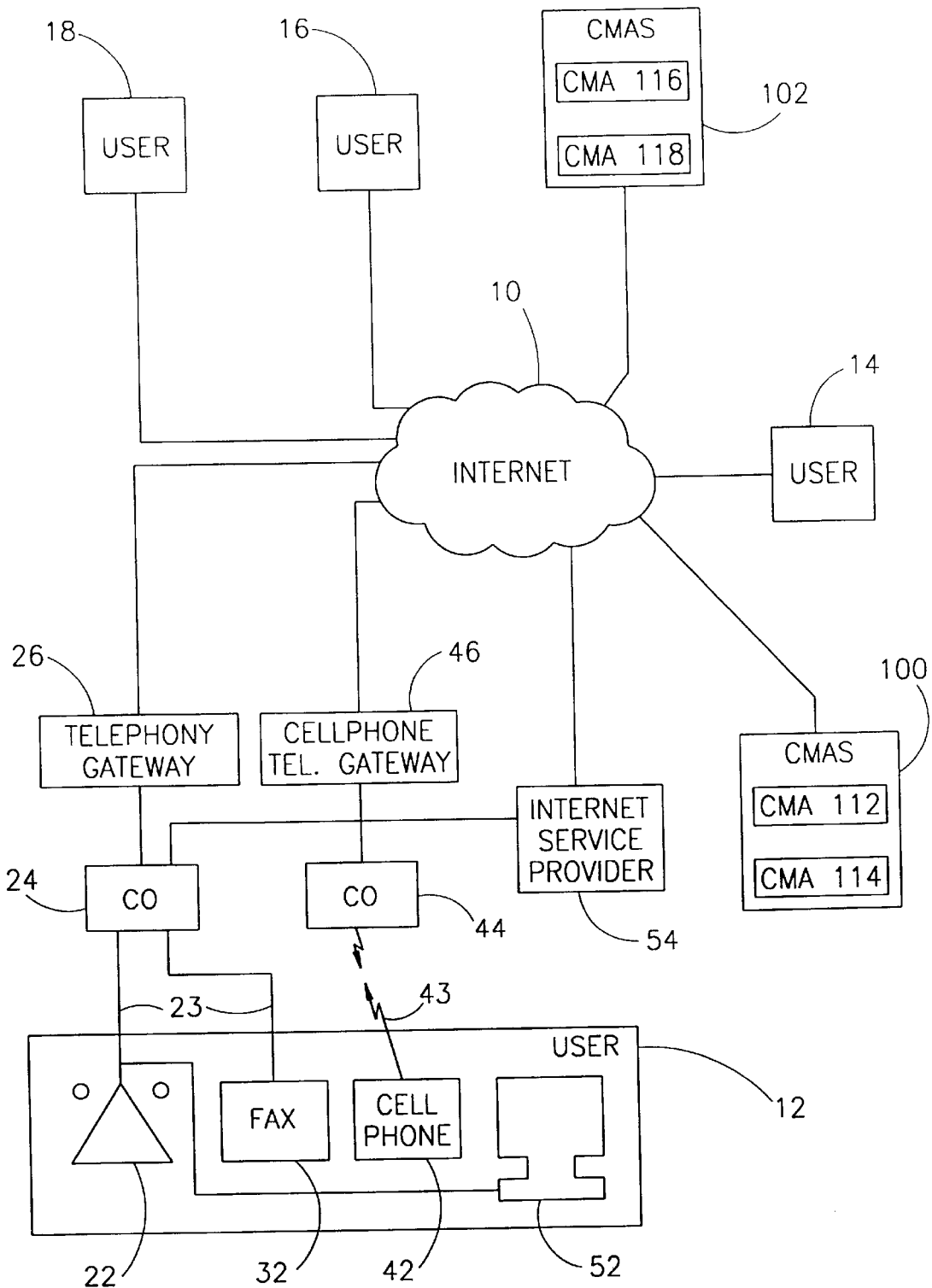
FIG. 1 is a schematic block diagrams of a WAN—conventional telephony network including a communications management system, constructed and operative in accordance with a preferred embodiment of the present invention.

Reference is now made to FIG. 1 which illustrates an integrated digital packets—conventional telephony WAN, generally referenced 10. In the preferred embodiment WAN 10 is the INTERNET with accesses of conventional telephony via telephony gateways. WAN 10 has a plurality of subscribers of which only four, referenced 12, 14, 16 and 18 are shown in the illustrated embodiment Each subscriber employs a plurality of communication devices to communicate with other subscribers over the INTERNET. As detailed for illustration purposes only for user 12, each user has a telephone 22 and a facsimile machine 32 connected to his telephone company central office (CO) via conventional telephony network 23. CO 24 is connected to the INTERNET via telephony gateway 26, such as the telephony gateway commercially available from VocalTec Inc. of New Jersey, USA. Telephony gateway 26 equipped with the INTERNET PHONE™ gateway application enables telephone 22 to operate as one of the WAN audio transceiving applications.

User 12 also employs a cellular telephone 42 connected to his cellular telephone company central office 44 via cellular network 43 and therefrom via telephony gateway 46 to the INTERNET. User 12 also employs a computer 52 connected to the INTERNET via an INTERNET service provider server 54, such as via the America Online of USA server. Computer 52 is preferably equipped with the INTERNET PHONE™ application for audio conferencing and with corresponding application for video conferencing and the like.

According to the present invention, a precommunication request of an incoming communication to user 12 is directed to a personal Communication Management Agent (CMA) in a Communication Management Agent Server (CMAS), constructed and operative as described in detail hereinbelow. The CMA receives this precommunication request from a communication device employed by the call initiator or from an intermediate device to which communication devices the call initiator uses are connected. A nonlimiting example for an intermediate device is a communication center (CC), i.e. the central or the telephony gateway to which any of the communication devices 22, 32, 42 or 52 are connected.

The recipient CMA receiving the precommunication request from the call initiator or the intermediate device, determines to which device or devices the communication itself, being a single media or a multimedia communication, should be directed, according to a recipient communication receipt preferences. The CMA indicates same to the call initiator or the intermediate device which transmits accordingly the communication itself to the recipient device or devices.

In the present invention, each user establishes a personal CMA and modifies the content thereof at his own choice as described in detail hereinbelow.

In an alternative embodiment, a service provider can modify the content of the CMA on behalf of its subscribers in accordance with predetermined communication receipt preferences defined by the subscribers or in accordance with its own communication policy.

In yet another alternative embodiment, a group of users are connected to a single CMA which directs incoming communications to the preferred communication device or devices of each of the users connected to the CMA While the present invention is described with respect to a single user connected to a CMA it is equally applicable to a plurality of users connected to a single CMA or to a service provider modifying the CMA. These two latter embodiments are not further described.

Figure 2:
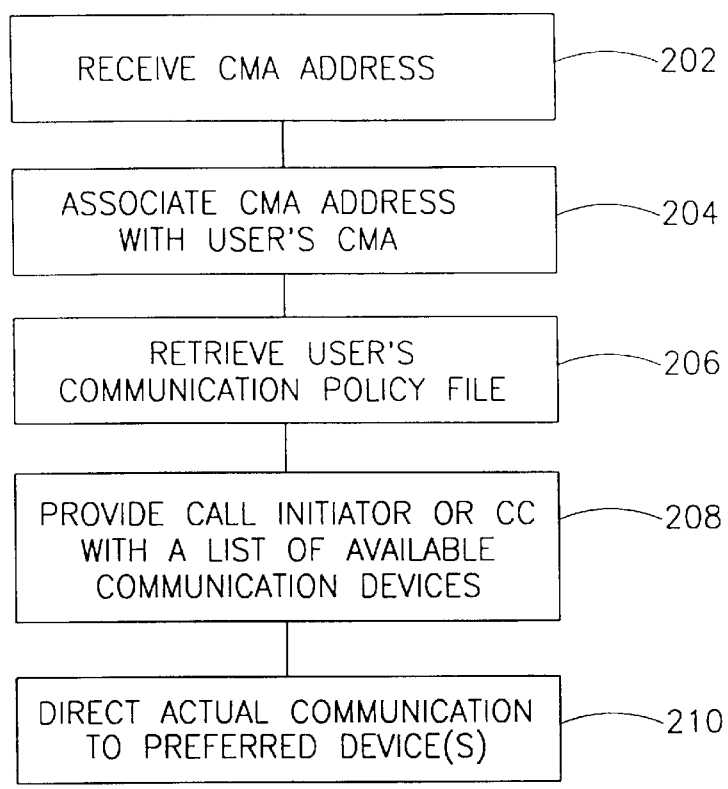
FIG. 2 is a schematic block diagram illustration of a preferred method for employing the call management system of the present invention.

The operation of the network of FIG. 1 is now described with reference to FIG. 2 and to a nonlimiting example in which user 18 initiates a call to user 12 which is therefore the recipient.

In the illustrated example, once user 18 initiates a call to recipient 12, a communication request including the CMA address of recipient 12 is provided to CMAS 100 which receives the CMA address as indicated by step 202.

In step 204, CMAS 100 associates the received CMA address with CMA 112.

In step 206, CMAS 100 retrieves the file representing the current communication receipt preferences of recipient 12 and provides user 18 who initiated the call or the CC thereof with a list of communication devices or network addresses to which the call should be transmitted (step 208). The actual communication is then being transmitted to the preferred device or devices of recipient 12 (step 210).

An example of communication receipt preference is receiving all audio communications whether originated from users 18 computer employing the INTERNET PHONE™ application or from its telephone or cellular telephone to cellular telephone 42.

While communicating with recipient 12, User 18 has to know recipient 12 CMA address. CMA addresses may be stored in any INTERNET guide in order to enable any user, like user 18 to find the recipient CMA address in case user 18 does not know it. Examples are the INTERNET white page guides, commercially available from a number of vendors, such as the white page service of infospace of Seattle, Wash., U.S.A. which may include also CMA addresses.

Once the communication initiator 18 receives the CMA address of recipient 12, initiator 18 needs to know the address of the CMAS in which 100 CMA 112 resides. In the Internet network, the CMAS 100 address is a TCP/IP address and the CMA 112 address is either an E-mail like address or a numerical address, such as an E,164 address.

It will be appreciated that the conversion between the CMA address and the CMAS address can be done in any suitable way known in the art. In the Internet, one can use the application converting E-mail addresses to E-mail server addresses adapted to convert CMA addresses to CMAS addresses.

It will be appreciated that while the operation of the network of FIG. 1 has been described with respect to initiator 18 and recipient 12 any user may call any other user and receive communications therefrom. It will further be appreciated that while reference has been made to user 18 which receives the list of communication device or devices to which the call should be directed, any of user's 18 CC may actually receive the preferred device of recipient 12 to which the actual communication should be directed.

For example, if user 18 employs his telephone to call user 12, the gateway thereof may call CMAS 100 and direct to user 12's preferred device the actual communication originated by user 18.

In an alternative embodiment, CMA 112 does not provide user 18, his telephony gateway or central office (CC) with the preferred device or devices to which the actual communication should be directed but rather redirects the request received from user 18 to another CMA of user 12.

For example, if recipient 12 executes his computer while receiving a call from user 18 he may provide CMAS 100 with an. Indication to redirect all incoming precommunications to his personal CMA located in his computer so as to control and adjust his communication receipt preferences on line from his computer.

In another preferred embodiment, the personal CMA may reside within any communication device carried by recipient 12, two non limiting examples being a his cellular phone and bi-directional pager. In this embodiment, all precommunication requests to recipient 12 are directed to the communication device he currently holds and any such precommunication request activates a pop up message on the communication device, thus enabling recipient 12 to determine on the fly in substantially real time to which communication device the communication itself should be directed. For example, the user may request directing all incoming audio communication via the INTERNET PHONE to be directed to his cellular phone while any image associated therewith should be directed to his facsimile machine as described in detail with reference to FIG. 8 hereinbelow.

Figure 3:
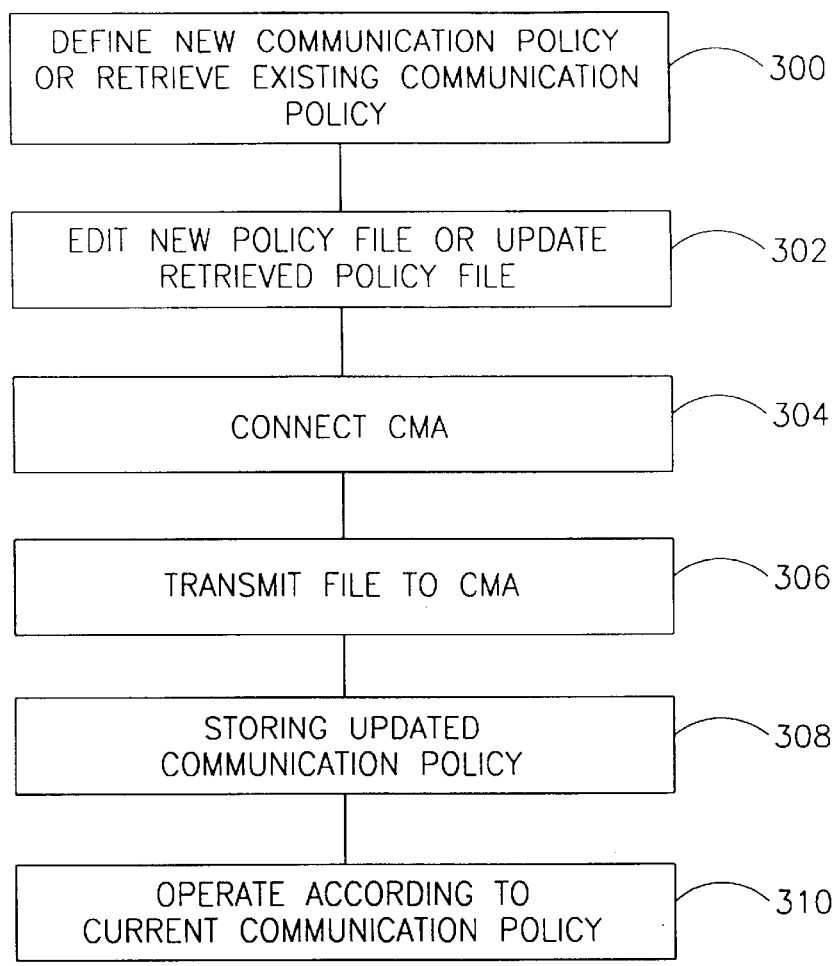
FIG. 3 is a schematic block diagram illustration of a preferred method for updating a user communication policy stored in the communications management agent server of the present invention.
Figure 4:
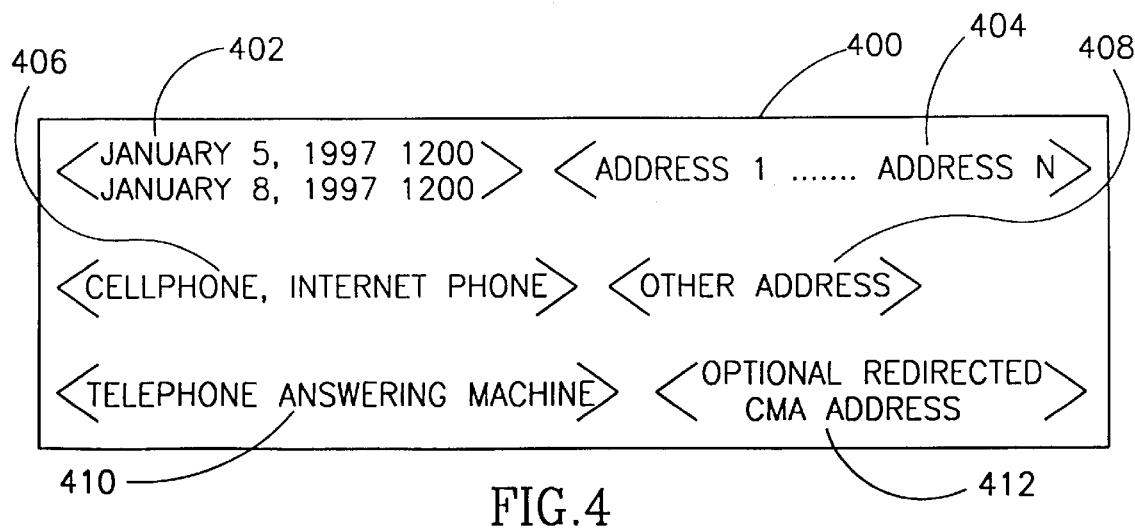
FIG. 4 is a schematic illustration of a file including a communication policy of a user.

It will be appreciated that the communication policy of each user can be modified at the user's request as illustrated to FIGS. 3 and 4 to which reference is now made. FIGS. 3 and 4 which are a schematic block diagram illustration of a preferred method for updating a user, say user 12's communication policy stored in CMA 112 and a schematic illustration of a non limiting file including the user's current communication policy.

The update operation starts with the user defining, preferably but not necessarily off line, a new communication policy as indicated by step 300 or by retrieving the existing policy file from the CMA. For example, while the current policy is, to receive all audio communication in cellular phone 42, the new policy may be receiving in the next three days all audio communications from a list of users in any of his cellular phone 42 or computer 52 if it is on-line while receiving all other audio communications in his telephone answering machine.

In a preferred embodiment the new or retrieved policy file is edited (stop 302) in the computer 52. A nonlimiting example of a policy file is policy file 400 illustrated in FIG. 4. In the non limiting example of FIG. 4, policy file 400 includes the available communication devices (406) for receiving communications, of one or more media type, at each time interval (402) for certain call initiators (404) and a different available device (410) for second certain call initiators. Policy file 400 also includes optional redirection of all communication requests to another CMA address as described in detail herein below. The user then connects his CMA as indicated by step 304 and transmits the current updated policy file to CMA 112 (step 306). CMAS 100 stores the new file as Indicated by step 308 and CMA 112 starts operating in accordance with the new policy (step 310) as described hereinabove.

It will be appreciated that the user ran define a default policy file so if the current policy file includes a time limitation, CMA 112 will return to its default mode of operation once the time for the current communication policy (three day in the example described above) expires.

It will be appreciated that the user can update CMA 112 in any other suitable manner, such as updating on line a WEB page of CMA 112.

It will also be appreciated that the user may define a scan policy to the CMA. In such definition, the CMA, say CMA 112, scans in which device from a number of possible devices of equal preference the user answers and indicates that the communication itself should be directed to that device.

Figure 5:
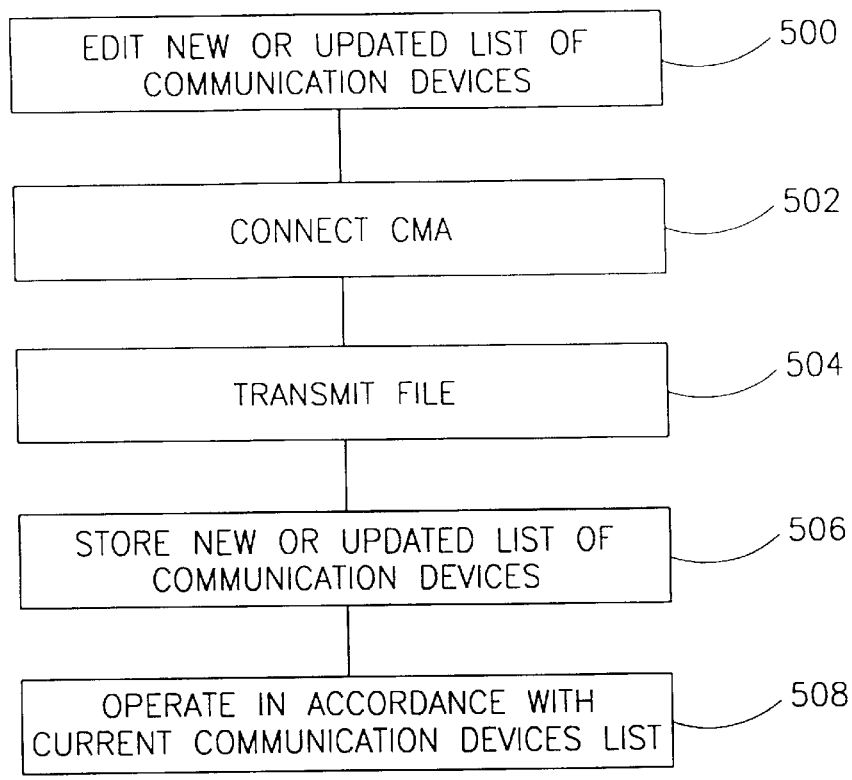
FIG. 5 is a schematic block diagram illustration of a preferred method for updating the communication device list.

It will further be appreciated that the user may not only update its preferred communication policy but also the list of communication devices he operates as illustrated in FIG. 5 to which reference is now made.

In a preferred method for updating the communication devices list the user edits an updated list of communication devices as indicated by 500, connects to his CMA (step 502), transmits the updated list (step 504) which is being stored in the CMAS in which the user's CMA is located (step 506). Operation then continues with the updated list of communication devices (step 508). Similarly, the user can edit a new list or modify the current device list.

In another preferred embodiment of the present invention the updating of the communication devices is done automatically. For example, as part of the installation procedure of the INTERNET PHONE™ application, the user may configure the application such that it will automatically communicate with its CMA and update the list of available communication devices.

Similarly, one may set any of the communication devices to expire in a certain time or upon the occurrence of a particular event.

Figure 6:
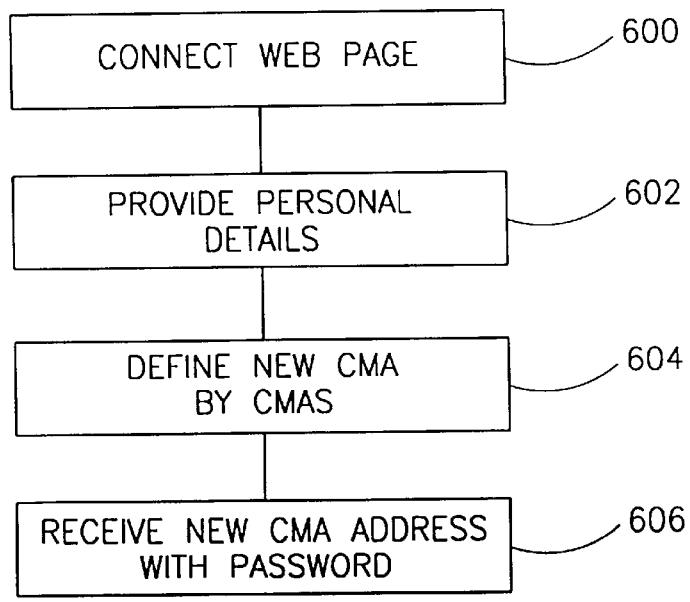
FIG. 6 is a schematic block diagram illustration of an initial registration procedure to the communication management agent server of the present invention.

Reference is now made to FIG. 6 which illustrates a preferred method for establishing a CMA in a CMAS.

In step 600 a WAN user, such as user 12 connects to a WEB page of CMAS 100. In step 602, user 12 fills in personal details, such as telephone number, e-mail address and the like. In step 804, CMA server 100 defines a new CMA (CMA 112 in the present example) and provides its address to user 12, preferably with a security mean, such as a password. If a password is required, user 12 then uses his password whenever he connects to CMA 112, such as when updating his communication policy (step 304, FIG. 3) or the list of communication devices (step 502, FIG. 5).

A particular advantage of the present invention is that it provides a communication device independent communications system, i.e. communication is directed to a user and not to a communication device as is the current situation both with conventional telephony and network communication applications.

This advantage provides a user to initiate a conference call with any number of other network users employing his CMA. In a preferred embodiment of the present invention, a user may indicate to a conferencing server the other users to confer with, the conferencing server connects to each user via their respective CMA as decided hereinabove.

Figure 7:
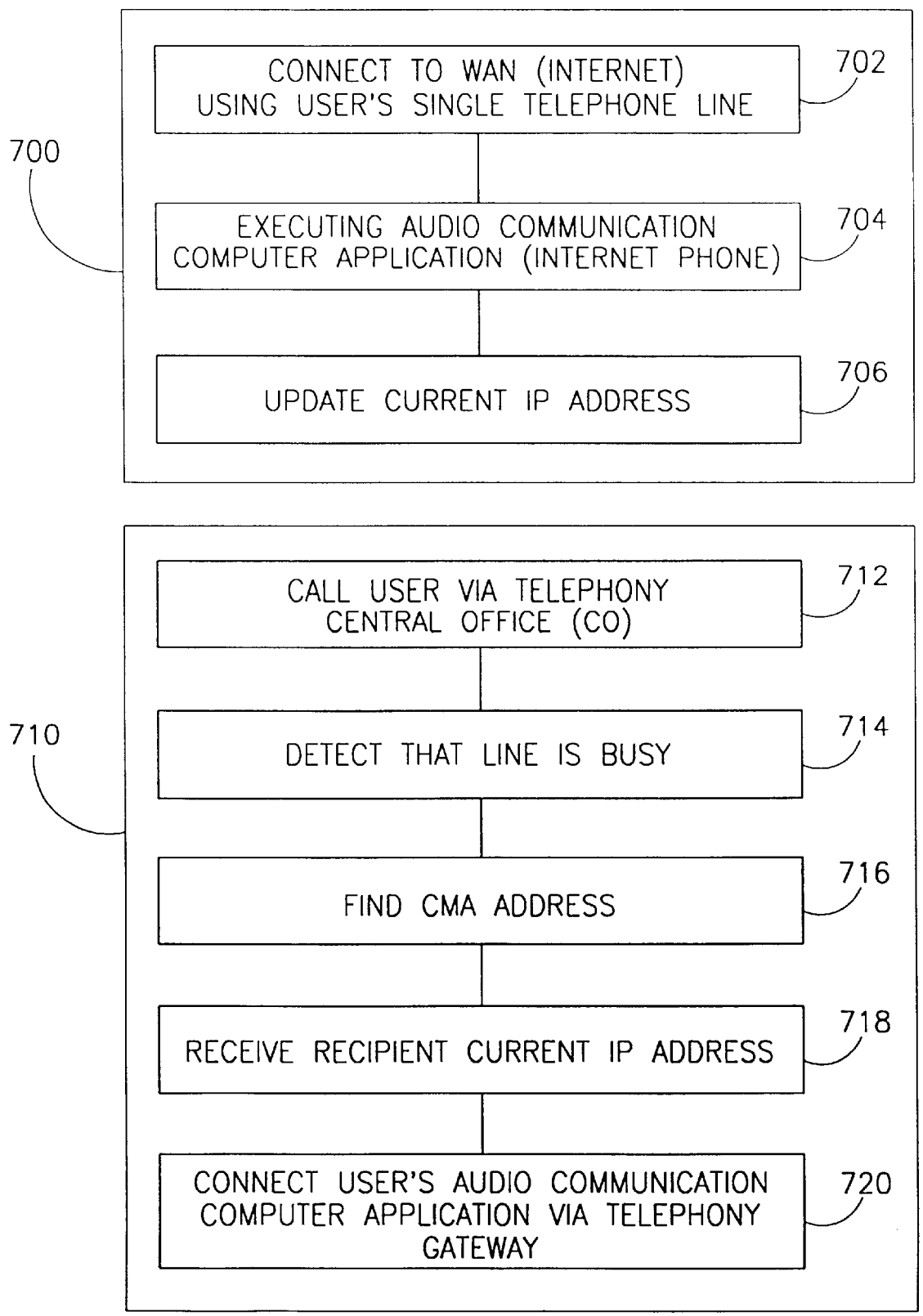
FIG. 7 is a schematic block diagram illustration of another method for employing the system of the present invention.

Reference is now made to FIG. 7 which illustrates a method for using the CMA of the present invention for directing phone calls at substantially any time to users having a single telephone line and which use it for long period of times, such as for browsing the INTERNET, using their single telephone line for relatively long term connection to the INTERNET. According to the present invention, any user executing the INTERNET PHONE™ application may be accessed from any audio communication device substantially any time.

The method generally includes the step of setting, referenced 700, and the step of operating designated 710.

The setting step 700 includes the step 702 of connecting to the INTERNET via the single telephone line the user has, the step 704 of executing the INTERNET PHONE™ application resulting in the user being connected to the INTERNET and therefore his single telephone line is busy. Then, the current IP address is updated in the CMA as indicated by step 706.

In the operating step, a user, say user 18, initiates an audio communication to user 12 who is connected to the INTERNET as described for the setting step and referenced 712. Central office 24 detects that line 23 of user 12 is busy as indicated by 714 and finds users 12 CMA address as indicated in step 716. The CMA address is found by associating the users telephone number with his CMA in any suitable data base available to the CC. CMA 112 provides the IP address of user 12 executing the INTERNET PHONE™ application to gateway 28 as indicated by 720 so as to enable receipt of audio communications when the conventional telephone line is busy as indicated by step 720.

It will be appreciated that while the present invention is not limited by what has been described hereinabove and that numerous modifications, all of which fall within the scope of the present invention, exist. For example, while the present invention has been described with reference to personal CMA, the method and system of the present Invention is not limited thereto and is similarly applicable to CMAS utilized by the telephony gateways to function efficiently, such as in accordance with Least Cost Routing (LCR) and availability considerations. For example, while user 18 calls user 12 the actual communication can be directed through various gateways other than gateways 28 or 46 if the transmission is more efficient.

Figure 8:
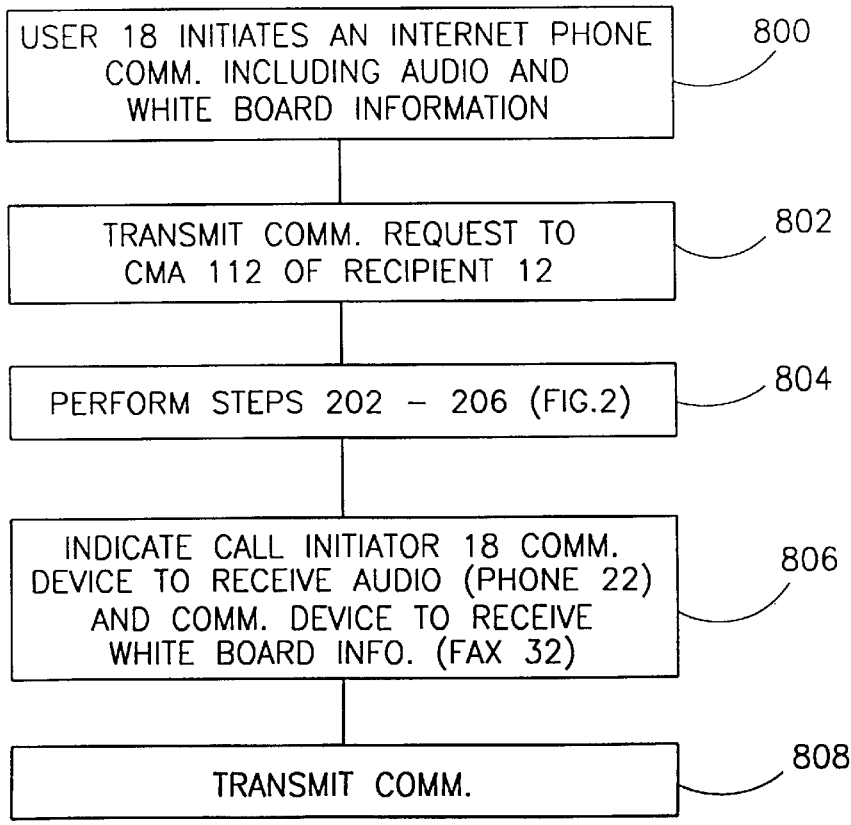
FIG. 8 is a schematic block diagram illustration of cross-media communication in accordance with the present invention.

Reference is now made to FIG. 8. which illustrates yet another preferred embodiment of the present invention. In the embodiment of FIG. 8 communications of one media type are directed to a communication device of a different media type. FIG. 8 provides a nonlimiting example of the method of FIG. 2 for cross media communication receipt. In the illustrated embodiment, user 18 initiates a communication to recipient 12, the communication Is an integrated audio communication and white board communication. In step 802 call initiator 18 transmits a precommunication request to CMA 112. In step 804, recipient 12 CMA receives the precommunication request initiated by user 18 and determines according to user 12 receipt preferences policy file that the audio part of the communication should be directed to recipient 12 telephone 22, while the white board part of the same communication should be directed to recipient 12 facsimile machine 32 (according to steps 202–206 of FIG. 2). In step 806, CMA 112 provides an indication to the precommunication requester (call initiator 18) that the audio part should be directed to telephone 22 and the white board part to facsimile 32. Finally, in step 808, the recipient 12 receives the audio part of the communication via his phone 22 and the white board part thereof via his facsimile machine 32, sequentially if he has one telephone line and simultaneously if he has two telephone lines.

It will be appreciated that while the preferred embodiments of the present invention has been described with respect to a Wide Area Network and more specifically with respect to the INTERNET, it is equally applicable to any packet switched network such as Local Area Networks (LANs) and INTRANETS.

It will also be appreciated that the CMAs of the present invention can form a new type of a directory service in a packet switched network. For example, a plurality of CMAs, each for at least one user can replace current directory inquiry services of conventional telephone services and may also be used instead of current white pages directory services.

It will also be appreciated by persons skilled in the art that the present invention is not limited to what has been particularly shown and described hereinabove. Rather, the scope of the present invention is defined only by the claims that follow:

What is claimed is:

1. In a packet switched network having a plurality of users including at least one sending user and at least one receiving user, said at least one receiving user employing a plurality of communication devices, a method for communicating between said at least one sending user and said at least one receiving user in accordance with the communication receipt preferences of said at least one receiving user, the method comprising:

provn a communication management agent (CMA) associated with said at least one receiving user, for managing at least one communication device in accordance with the communication device preferences of said at least one receiving user;

receiving at least one precommunication request from at least one communication device of said at least one sending user, for directing a communication from said at least one sending user to at least one communication device of said at least one receiving user, to the CMA associated with said at least one receiving user;

transmitting an indication to said at least one communication device of said at least one sending user to direct said communication from said at least one communication device of said at least one sending user to said at least one communication devices of said at least one said receiving user; and establishing a communication from said at least one communication device of said at least one sending user to at least one communication device of said at least one receiving user in accordance with said indication, said indication is according to said communication device preferences of said at least one receiving user.

2. The method of claim 1, wherein said step of providing a CMA additionally comprises providing:

a network address for receiving said precommunication request;

a communication policy file; and a list of communication devices that are arranged in accordance with said communication policy file.

3. The method of claim 1, wherein said step of establishing further comprises the steps of:

providing a pop up, message to said at least one communication device; and determining in substantially real time, to which of said at least one communication device said communication should be directed.

4. The method of claim 1, wherein said indication is a unique identifier for enabling communication with said at least one communication device of said at least one receiving user.

5. The method of claim 1, wherein said packet switched network is selected from the group comprising: a wide area network (WAN), the INTERNET, a local area network (LAN) and an INTRANET.

6. In a packet switched network having a plurality of users including at least one sending user and at least one receiving user, said at least one receiving user employing a plurality of communication devices, a method for communicating between said at least one sending user and said at least one receiving user in accordance with communication preferences of said at least one receiving user, the method comprising:

providing a communication management agent (CMA) associated with said at least one receiving user, for managing at least one communication device in accordance with the communication device preferences of:said at least one receiving user;

storing said current communication device preferences of said at least one receiving user in a data file associated with said CMA;

receiving at least one precommunication request from at least one communication device of said at least one sending user, to direct a communication to at least one communication device of said at least one receiving user to the CMA associated with said at least one receiving user; and.

responding to a said precommunication request frog said at least one sending user, including:

retrieving said data file to obtain said communication device preferences of said at least one receiving user; and providing said at least one sending user with a list of communication devices to which said communication should be sent; and establishing a communication from said at least one communication device of said at least one sending user to at least one communication device of said at least one receiving user in accordance with said communication device preferences of said at least one receiving user.

7. In a packet switched network having a plurality of users including at least one sending user and at least one receiving user, said at least one receiving user employing a plurality of communication devices, a method for communicating between said at least one sending user and said at least one receiving user in accordance with communication preferences of said at least one receiving user, the method comprising:

providing a communication management agent (CMA) associated with said at least one receiving user, for managing at least one communication device in accordance with the communication device preferences of said at least one receiving user;

storing said current communication device preferences of said at least one receiving user in a data file associated with said CMA;

receiving at least one precommunication request from at least one communication device of said at least one sending user, to direct a communication to at least one communication device of said at least one receiving user to the CMA associated with said at least one receiving user; and responding to a said precommunication request from said at least one sending user, including:

retrieving said data file to obtain said communication device preferences of said at least one receiving user; and providing said at least one sending user with a list of communication network addresses to which said communication should be sent; and establishing a communication from said at least one communication device of said at least one sending user to at least one communication device of said at least one receiving user in accordance with said communication device preferences of said at least one receiving user.

* * * * *